(12) United States Patent
Krishna et al.

(10) Patent No.: US 10,941,843 B2
(45) Date of Patent: Mar. 9, 2021

(54) TELESCOPIC DIFFERENTIAL SCREW MECHANISM BASED 3-DOF-PARALLEL MANIPULATOR PLATFORM TO ACHIEVE OMNIDIRECTIONAL BENDING

(71) Applicant: International Institute of Information Technology, Hyderabad, Hyderabad (IN)

(72) Inventors: Madhava Krishna, Hyderabad (IN); Akash Singh, Hyderabad (IN); Enna Sachdeva, Hyderabad (IN); Vinay Rodrigues, Hyderabad (IN)

(73) Assignee: International Institute of Information Technology, Hyderabad, Hyderabad (IN)

( * ) Notice: Subject to any disclaimer, the term of this patent is extended or adjusted under 35 U.S.C. 154(b) by 254 days.

(21) Appl. No.: 16/254,486

(22) Filed: Jan. 22, 2019

(65) Prior Publication Data

US 2019/0234499 A1    Aug. 1, 2019

(30) Foreign Application Priority Data

Jan. 22, 2018  (IN) .............................. 201841002537

(51) Int. Cl.
*B25J 9/00* (2006.01)
*F16H 25/20* (2006.01)
*B25J 18/02* (2006.01)
*B25J 17/00* (2006.01)

(52) U.S. Cl.
CPC .......... *F16H 25/2056* (2013.01); *B25J 9/003* (2013.01); *B25J 17/00* (2013.01); *B25J 18/025* (2013.01); *F16H 25/2015* (2013.01)

(58) Field of Classification Search
CPC .... B25J 9/0033; B25J 18/025; F16H 25/2056
See application file for complete search history.

(56) References Cited

U.S. PATENT DOCUMENTS

| | | | | |
|---|---|---|---|---|
| 4,806,068 A * | 2/1989 | Kohli | ......................... | B25J 9/04 414/735 |
| 4,907,937 A * | 3/1990 | Milenkovic | .......... | B25J 17/0258 414/735 |
| 4,976,582 A * | 12/1990 | Clavel | .................... | B25J 9/1065 108/138 |
| 5,028,180 A * | 7/1991 | Sheldon | ............. | B23Q 11/0032 409/201 |
| 5,129,279 A * | 7/1992 | Rennex | ................ | B25J 17/0216 414/735 |

(Continued)

*Primary Examiner* — William Kelleher
*Assistant Examiner* — Gregory T Prather

(57) ABSTRACT

A telescopic differential screw mechanism based 3-DOF Parallel Manipulator system to enable differential length and omnidirectional bending is provided. The telescopic differential screw mechanism based 3-DOF Parallel Manipulator system includes a first circular rotating plate 102, a second circular rotating plate 104, three or more telescopic screw assemblies 106A-C and three or more actuators 108A-C. Each telescopic screw assembly 106 includes a pair of master screws 110, a pair of successive screws 112 and a universal joint 116. The three or more telescopic screw assemblies 106A-C are actuated differentially using the three or more actuators 108A-C to achieve omnidirectional bending with high angular rotations in a range of 0 to 75 degree.

18 Claims, 9 Drawing Sheets

(56) References Cited

U.S. PATENT DOCUMENTS

| | | | | |
|---|---|---|---|---|
| 5,388,935 | A * | 2/1995 | Sheldon | B23Q 1/5462 248/631 |
| 5,937,699 | A * | 8/1999 | Garrec | B25J 18/025 74/89.35 |
| 5,987,726 | A * | 11/1999 | Akeel | B23P 19/105 29/407.08 |
| 6,024,526 | A * | 2/2000 | Slocum | B25J 17/0216 414/226.01 |
| 6,382,039 | B1 * | 5/2002 | Choi | B25J 18/025 108/147.19 |
| 6,516,681 | B1 * | 2/2003 | Pierrot | B25J 17/0266 74/490.01 |
| 2009/0016814 | A1 * | 1/2009 | Cheng | F16H 25/2056 403/294 |
| 2009/0158871 | A1 * | 6/2009 | Chuo | F16H 25/2252 74/89.35 |
| 2009/0249905 | A1 * | 10/2009 | Chen | F16H 25/2056 74/89.37 |
| 2009/0249906 | A1 * | 10/2009 | Chen | F16H 19/0663 74/89.37 |
| 2010/0218479 | A1 * | 9/2010 | Moradell-Casellas | F02K 1/72 60/226.2 |
| 2012/0067148 | A1 * | 3/2012 | Long | F16H 1/22 74/412 R |
| 2014/0331806 | A1 * | 11/2014 | Nagatsuka | B25J 18/00 74/490.01 |
| 2015/0321360 | A1 * | 11/2015 | Galipienzo Huguet | B25J 9/0057 74/490.06 |
| 2015/0343631 | A1 * | 12/2015 | Martinez-Esponda | B25J 11/005 74/490.03 |
| 2015/0367516 | A1 * | 12/2015 | Sarh | B25J 9/0042 700/259 |
| 2016/0263641 | A1 * | 9/2016 | Savoy | B21J 15/10 |
| 2017/0175859 | A1 * | 6/2017 | Brockmeier | A61M 5/31511 |
| 2017/0211670 | A1 * | 7/2017 | Boch | F16H 25/2454 |
| 2017/0239820 | A1 * | 8/2017 | Ohta | B25J 17/0275 |
| 2018/0085913 | A1 * | 3/2018 | Ilch | B25J 17/0266 |
| 2019/0113116 | A1 * | 4/2019 | Zhong | F16H 25/2056 |
| 2019/0232485 | A1 * | 8/2019 | Reese | B25J 9/0057 |
| 2019/0390752 | A1 * | 12/2019 | Tsai | F16H 25/2015 |
| 2020/0055196 | A1 * | 2/2020 | Halpenny | E21B 47/01 |

* cited by examiner

TELESCOPIC DIFFERENTIAL SCREW MECHANISM BASED 3-DOF-PARALLEL MANIPULATOR PLATFORM TO ACHIEVE OMNIDIRECTIONAL BENDING

BACKGROUND

Technical Field

The embodiments herein generally relate to omnidirectional bending, and more particularly, to a telescopic differential screw mechanism based three degree of freedom parallel manipulator system to achieve omnidirectional bending.

Description of the Related Art

Existing approaches for achieving omnidirectional bending is done using prismatic actuators, electric actuators or hydraulic actuators based on three degree of freedom (3-DOF) Parallel Manipulator system. The disadvantages with this type of actuators for achieving omnidirectional bending is that in order to increase the desired bending angle, the length of the actuators increases proportionally. The increase in length of the actuators or screws or nuts increases the material cost for production. Also, these types of actuators that are used for achieving omnidirectional bending require high maintenance cost and high production cost. Though, certain compliant snake robot structures have advantages while crawling over uneven surface etc., they face tough challenges in moving over larger obstacles due to the thin cross-section. Also, challenges like large turning radius, restrict its maneuverability in tight spaces. The joints used in existing design of compliant tracked robots consist of revolute actuated joints. One existing design in such robot consists of a series of actuated joints interconnected with each other using connecting plates. This design structure enables the robot to have compliance in both the directions. But, the total length of the median line passing through the center of the connecting plates of the robot remained constant. In few of the existing approaches for achieving omnidirectional bending, the three degree of freedom (3-DOF) parallel manipulator system consisting of linear screw actuators include normally 3 screws and 3 nuts (any type) of equal sizes necessarily to achieve omnidirectional bending which further increases the total size of actuator and subsequently increases the size of the assembly in height. Also, the amount of angular rotation depends on the count of the actuators that connects top and bottom surfaces. The misalignment in single actuator of the existing approaches may collapse the entire functioning.

Accordingly, there remains a need for a differential screw mechanism based three degree of freedom (3-DOF) parallel manipulator system for achieving omnidirectional bending.

SUMMARY

In an embodiment, a three degree of freedom (3-DOF) telescopic screw parallel manipulator system to enable differential length and omni-directional bending of the system, includes a first circular rotating plate, a second circular rotating plate that is coupled to the first circular rotating plate using at least three telescopic screw assemblies, wherein the at least three telescopic screw assemblies that are actuated by at least three actuators that rotate in a first direction or a second direction, wherein each of the at least three telescopic screw assemblies comprise a right-left telescopic screw assembly part and a left-right telescopic screw assembly part that are coupled to each other using at least three universal joints, wherein the at least three telescopic screw assemblies include a first telescopic screw assembly, a second telescopic screw assembly, or a third telescopic screw assembly, wherein the first telescopic screw assembly comprises (i) a first right left telescopic screw assembly part that include a first master screw comprising a first end and a second end that rotates in the first direction, and a first successive screw comprising a first end and a second end, wherein the first end of the first successive screw is coupled to the second end of the first master screw, wherein the first master screw is adapted to rotate with respect to the first successive screw in a telescopic arrangement, (ii) a second left-right telescopic screw assembly part that include a second master screw comprising a first end and a second end, wherein the first end of the second master screw is coupled to the first end of the first master screw using a first universal joint and enables the transfer of a rotation from the first master screw to the second master screw in the first direction, and a second successive screw comprising a first end and a second end, wherein the first end of the second successive screw is coupled to the second end of the second master screw, wherein the second master screw is adapted to rotate with respect to the second successive screw in the telescopic arrangement, wherein the at least three actuators that enable (a) synchronous or (b) differential actuation of at least three telescopic screw assemblies in the first direction to enable the first rotation of the first master screw inside a first length of the first successive screw and the second rotation of the second master screw inside a second length of the second successive screw, wherein the actuation in a second direction enables third rotation of the first master screw outside the first length of the first successive screw and the forth rotation of the second master screw outside the second length of the second successive screw in the telescopic arrangement, thereby subtracting or adding a part of a length of the telescopic screw assembly based on the direction of the actuation.

In an embodiment, the three degree of freedom (3-DOF) telescopic screw parallel manipulator system that enables actuation of a first telescopic screw assembly, a second telescopic screw assembly, and a third telescopic screw assembly synchronously in a first direction for enabling an addition of a length of the three degree of freedom (3-DOF) telescopic screw parallel manipulator system.

In an embodiment, the three degree of freedom (3-DOF) telescopic screw parallel manipulator system enables actuation of a first telescopic screw assembly, a second telescopic screw assembly, and a third telescopic screw assembly synchronously in a second direction for enabling reduction of a length of the three degree of freedom (3-DOF) telescopic screw parallel manipulator system.

In an embodiment, the three degree of freedom (3-DOF) telescopic screw parallel manipulator system includes at least one of a first telescopic screw assembly, a second telescopic screw assembly, or a third telescopic screw assembly that is actuated in at least one of the first direction or the second direction to enable omni-directional bending of the three degree of freedom (3-DOF) telescopic screw parallel manipulator system in a range of 0 to 75 degrees.

In an embodiment, the three degree of freedom (3-DOF) telescopic screw parallel manipulator system performs a differential actuation of at least three of the three telescopic screw assemblies that enable omni-directional bending of the three degree of freedom (3-DOF) telescopic screw parallel manipulator system, wherein the at least three actuators comprise a first actuator that actuates a first master screw to rotate with respect to a first successive screw wherein the rotation of the first master screw passively rotates a first universal joint.

In an embodiment, the differential actuation of the at least three telescopic screw assemblies enables bending in a direction of the length of the telescopic screw assembly with relative reduction in the length with respect to other telescopic screw assemblies of the at least three telescopic screw assemblies.

In an embodiment, the three degree of freedom (3-DOF) telescopic screw parallel manipulator system includes at least three screw assemblies that are arranged at equal distance to each other.

In an embodiment, the three degree of freedom (3-DOF) telescopic differential screw system includes a plurality of the successive screws that are adapted in telescopic arrangement in each of at least three telescopic screw assemblies to enable adaptive length and omni-directional bending of the system.

In an embodiment, the three degree of freedom (3-DOF) telescopic differential screw system includes (i) a first nut with a third length, wherein a second end of a first successive screw is coupled to the first circular rotating plate with the first nut, wherein the first successive screw is adapted to rotate inside a third length of the first nut in the telescopic arrangement, and (ii) a second nut with a forth length wherein, a second end of a second successive screw is coupled to a second circular rotating plate with the second nut, wherein the second successive screw is adapted to rotate inside a forth length of the second nut (114B) in the telescopic arrangement.

In an embodiment, the three degree of freedom (3-DOF) telescopic screw parallel manipulator system includes (i) a first stopper mechanism to stop further rotation of a first master screw on reaching the second end and to transfer the rotation to a first successive screw and (ii) a second stopper mechanism to stop further rotation of the first successive screw on reaching the second end and transfer the rotation to a first nut, wherein the first master screw is adapted to rotate inside the first length of the first successive screw and the first successive screw is adapted to rotate inside the a length of the first nut.

In an embodiment, the first master screw is coupled with the first successive screw, such that outer threads of the first master screw match with inner threads of the first successive screw to achieve relative motion between the first master screw and the first successive screw.

In an embodiment, the first circular rotating plate is coupled to the second circular rotating plate using at least three telescopic screw assemblies that are arranged to each other at 120 degree.

In an embodiment, the first master screw and the second master screw include a head that is attached at a first end, wherein the head includes a pair of apertures that is adapted to hold the first universal joint to achieve omnidirectional bending of the system.

In an embodiment, the first successive screw and the second successive screw comprise inner threads and the outer threads that are adapted to realize the stopper mechanism.

In an embodiment, the first universal joint is adapted to couple a first master screw and a second master screw using the pair of apertures in a head of the first master screw and in a head of the second master screw, wherein the first universal joint transfers the rotation from the first master screw to the second master screw to provide omnidirectional bending in a required direction when actuated by a actuator.

In an embodiment, a telescopic differential screw system assembly includes at least two of the three degree of freedom (3-DOF) telescopic screw parallel manipulator systems in a cascading arrangement, wherein a first master screw of a second 3-DOF parallel manipulator system is coupled to a second master screw of the first 3-DOF parallel manipulator system through a common shaft, wherein the common shaft is adapted to rotate inside a hollow cavity of the master screws that transfers the first rotation when at least one actuator actuates at least one telescopic screw assembly, to at least one of telescopic screw assemblies of the second 3-DOF parallel manipulator system through the master screws wherein, the second nut holds the second successive screw and a successive screw of the second 3-DOF parallel manipulator system.

In an embodiment, a telescopic differential screw system assembly that includes at least three common shafts wherein the common shafts bend the telescopic screw assemblies in the second 3-DOF parallel manipulator system and the first 3-DOF parallel manipulator system simultaneously, with at least three actuators that actuate at least three telescopic screw assemblies.

In an embodiment, a telescopic differential screw system assembly is included in a robotic arm.

The Omnidirectionally bendable multidirectional locomotive module facilitates compliant high traction surface actuation with a single driving actuator that is capable of driving the omnidirectionally bendable multidirectional locomotive module or an omnidirectionally bendable multidirectional locomotive assembly. With the combination of internal compliance and a driving actuator the omnidirectionally bendable multidirectional locomotive module is capable of forward, backward locomotion and differential locomotion. An omnidirectionally bendable multidirectional locomotive module achieves versatility, owing to the compliance on an uneven surface and omnidirectional crawling, and which enhances its capabilities to exhibit various locomotive traits in different configurations of the robot assembly. In an embodiment, duel application of omni-crawler module in which in one case it acts as a longitudinal surface over which the chain-curved components combination of the crawler module runs over the surface of the robot maintaining strict contact with chassis or the body, thereby moving the robot in forward and backward directions and the second application being vertical legged or wheeled movement of the same robot in vertical configuration. The module in the longitudinal mode is a thin circular cross-sectioned but long structure which provides high traction with the ground, behaving like a surface actuated snake robot. The robot manufactured using this module is capable of moving in tight space and the omnidirectional nature of the module design helps moving laterally and also using omnidirectional compliance enables it to perform high traction motion even in lateral direction. In order to change the length of the chassis of the robot as well as maintaining the compliant nature of the robot, the omni-crawler robot includes a telescopic 3-DOF parallel manipulator system using linear actuator which help changing chassis length using individual power screw mechanisms and for omnidirectional bending with differential actuation of one or more telescopic screw assembly.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
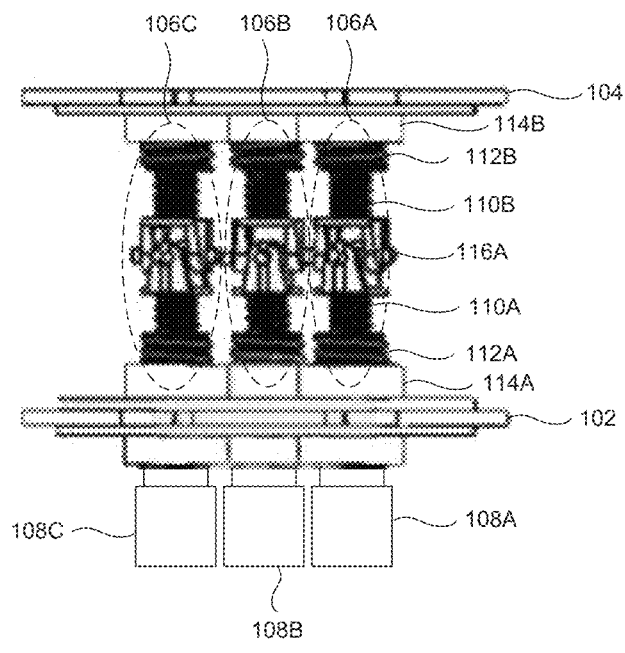
FIG. 1 illustrates a perspective view of a telescopic differential screw mechanism based 3-DOF Parallel manipulator system according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a compact and cost-effective mechanism to achieve omnidirectional bending. The embodiments herein achieve this by providing a telescopic screw mechanism based 3-DOF Parallel Manipulator system for achieving omnidirectional bending. Referring now to the drawings, and more particularly to FIGS. 1 through 9, where similar reference characters denote corresponding features consistently throughout the figures, preferred embodiments are shown.

FIG. 1 illustrates a perspective view of a telescopic differential screw mechanism based 3-degree of freedom (DOF)-Parallel Manipulator system according to an embodiment herein. The telescopic differential screw mechanism based 3-DOF Parallel manipulator system includes a first circular rotating plate 102, a second circular rotating plate 104, three or more telescopic screw assemblies 106A-C and three or more actuators 108A-C. The three or more telescopic screw assemblies 106A-C includes three telescopic screw assemblies such as a first telescopic screw assembly 106A, a second telescopic screw assembly 106B and a third telescopic screw assembly 106C. The three or more telescopic screw assemblies 106A-C are used to connect or couple the first circular rotating plate 102 and the second circular rotating plate 104. Each of the three telescopic screw assemblies 106A-C have right-left telescopic screw assembly parts and left-right telescopic screw assembly parts that are aligned at 120 degree between each other to achieve omnidirectional bending with high degree of freedom. In an embodiment, the three or more telescopic screw assemblies 106A-C of the telescopic differential screw mechanism based 3-DOF parallel manipulator system are aligned at different angles between each other to achieve omnidirectional bending with high degree of freedom.

The first telescopic screw assembly 106A includes a first master screw 110A, a second master screw 110B, a first successive screw 112A, a second successive screw 112B, a stopper mechanism, a first nut 114A, a second nut 114B, a first universal joint 116A and a first actuator 108A. A first end of the first master screw 110A and a first end of the second master screw 110B is coupled with one another using the first universal joint 116A. A second end of the first master screw 110A and a second end of the second master screw 110B is coupled to a first end of the first successive screw 112A and a first end of the second successive screw 112B respectively. In one embodiment, each telescopic screw assembly includes combination of the master screws and the successive screws such that outer threads of the master screws match with inner threads of the respective successive screws to achieve relative motion between the master screws and the respective successive screws. A second end of the first successive screw 112A and a second end of the second successive screw 112B is coupled to the first circular rotating plate 102 and the second circular rotating plate 104 respectively through the first nut 114A and the second nut 114B respectively. In an embodiment, the first nut 114A and the second nut 114B are attached in the first circular rotating plate 102 and the second circular rotating plate 104 for holding the first successive screw 112A and the second successive screw 112B. In another embodiment, the first nut 114A and the second nut 114B holds the first successive screw 112A and the second successive screw 112B respectively.

The first actuator 108A actuates the first master screw 110A. The first master screw 110A may reach to extreme thread ends when the first master screw 110A is actuated by the first actuator 108A. The stopper mechanism is used to stop further rotation of the first master screw 110A on reaching the extreme end (i.e. when they coincide) and transfer the rotation to the first successive screw 112A. The stopper mechanism is incorporated or installed in the first master screw 110A and the first successive screw 112A by including (a) a first large outer thread in the first master screw 110A and (b) a last small inner thread in the first successive screw 112A. The first large outer thread is large in size compared to other outer threads in the first master screw 110A. The last small inner thread is small in size compared to other inner threads in the first successive screw 112A. The relative rotation of the first master screw 112A and the first successive screw 112A passively rotates the first universal joint 116A. The universal joint 116A further transfers the rotation to the second master screw 110B on the other side. Similarly, the second master screw 110B and the second successive screw 112B also include the stopper mechanism to stop further rotation of the second master screw 110B on reaching the extreme end. The relative motion between the master screws and the successive screws in the first telescopic screw assembly along with passive compliance of the first universal joint 116A results in achieving bending in respective direction. Similarly, the second telescopic screw assembly 106B and the third telescopic screw assembly 106C are actuated to achieve bending in the respective directions.

In an embodiment, three or more telescopic screw assemblies 106A-C are positioned in 120 degrees alignment with respect to each other to achieve high angular rotation. The three or more telescopic screw assemblies 106A-C are actuated differentially in a controlled manner using relative rotation of the three or more actuators 108A-C. The relative rotation of three or more actuators 108A-C results in a differential change in length of each individual telescopic screw assembly which achieves the increase or decrease in a total length of the system thereby also allowing bending of the system in omni-direction through universal joints and compliant mechanisms in a robot.

Here is the list of the symbols used in the following calculations.

| Symbols | Value |
| --- | --- |
| N | Number of Telescopic levels of screw |
| SL | Length of screw including stopper |
| JH | Total height of Universal joint. |
| DL | Chain driving motor assembly length |
| TL | Chain tensioner assembly average length |
| UAH | Universal Joint arm height |
| Cl | Clearance length between the adjacent plates |
| LE | Original length of module |
| LR | Reduced length of module |
| Ns | Number of Telescopic levels of common shaft |
| Tw | Screw Thread width |
| Tc | Inter screw thread clearance |
| DN | Outer diameter of Nth level telescopic screw |
| Sw | Width of stopper between two adjacent screws in telescopic arrangement |

The level of the telescopic screw was decided by deciding the amount of length reduction that needs to be met. The total reduction in the length of the robot considered to be more than half the elongated length for the testing of the design.

$$LE = ((N*SL)*2)*2 + (JH)*2 + (Cl) + DL + TL \quad (1)$$

When the robot is in maximum reduction mode, the reduced length of the robot, LR $$LR = ((SL)*2)*2 + (JH)*2 + (Cl) + DL + TL \quad (2)$$

$$JH = 2*(UAH) \quad (3)$$

For reduction of more than half to happen, $$LR/LE < \tfrac{1}{2} \text{ or } LR/LE = \tfrac{1}{2}. \quad (4)$$

From Eq. (4) and (2),
Reduction of the length is aimed to be more than half of the total robot length. By considering LR/LE=½, and substituting in eq. (2), the value of the minimum screw length for each level is derived, considering screw lengths as equal. Due to design constraints, like the minimum size of high torque motors, and 3d printing precision limitations, the driving and tensioner length of the robots are kept fixed to as minimum as possible in an embodiment. Putting the constraints of driving length and tensioner mechanism. We get the level of the telescopic screws as 4.

$$N=4; \quad (5)$$

Each of the 3-DOF parallel manipulator systems are interconnected using a telescopic internal shaft. This ensures that both the systems rotate simultaneously. The number of levels of telescopic shaft is determined by the number of the levels of screws. Hence number of internal shaft telescopic levels, Ns $$Ns = N - 1 = 3; \quad (6)$$

The major design consideration to be taken care of for this robot is to make the cross section of small as possible. The internal screw will accommodate all the telescopic shafts when they are reduced to the minimum length. Apart from this considering minimum widths of screw threads and stopper mechanism between each telescopic level, made us arrive at the diameters of the screws of all telescopic screws as, $$DN = DN-1 + Tw + Tc + Sw. \quad (7)$$

The above equation is helpful in deciding the minimum diameter of the outermost screw effecting the arrangements of the screws, and eventually the minimum diameter of the chassis. In an embodiment, the telescopic screws aligned 120 degrees between two circular rotational plates and are placed as close as possible to induce maximum bending in minimal rotations of the screws in the compliance mode.

Figure 2:
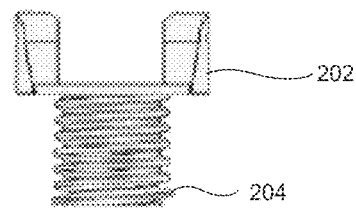
FIG. 2 illustrates an exploded view of a master screw of FIG. 1 according to an embodiment herein.

FIG. 2 illustrates an exploded view of the master screw of FIG. 1 according to an embodiment herein. The master screw includes a first end and a second end. A head 202 is attached at the first end of the master screw. The master screw includes the first large outer thread 204, which is large in size compared to the other outer threads, adapted to incorporate or realize the stopper mechanism with the successive screw.

Figure 3:
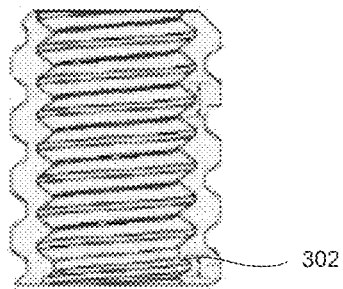
FIG. 3 illustrates an exploded view of a successive screw of FIG. 1 according to an embodiment herein.

FIG. 3 illustrates an exploded view of the successive screw of FIG. 1 according to an embodiment herein. The successive screw includes the smaller inner thread 302, which is small in size compared to the outer thread 204 of the master screw, adapted to incorporate or realize the stopper mechanism with the master screw when the rotation length of the master screw is inside or outside except for the second end. The successive screw (112A, 112B) also has a first end and a second end. The successive screw (112A, 112B) can be further cascaded with another successive screw of a larger diameter. The inner threads 302 of successive screw (112A, 112B) are adapted to realize stopper mechanism at the end of the successive screw length. In cascading telescopic arrangement one or more successive screws (112A, 112B) can be adapted to rotate with respect to each other when actuated, transferring the rotation to the next successive screw or a nut.

Figure 4:
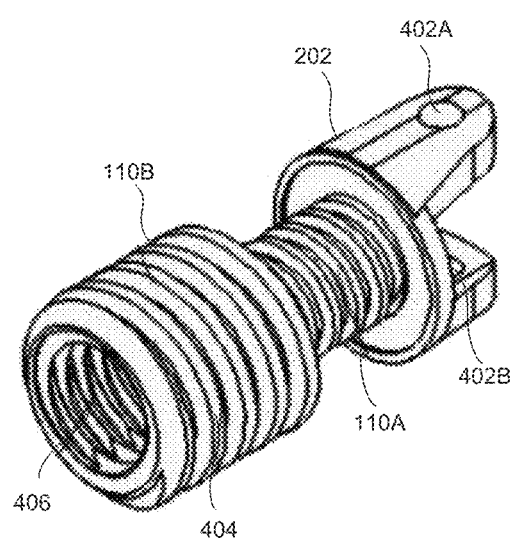
FIG. 4 illustrates an exploded view of a first master screw coupled to a first successive screw of FIG. 1 according to an embodiment herein.

FIG. 4 illustrates an exploded view of the first master screw 110A coupled to the first successive screw 112A of FIG. 1 according to an embodiment herein. The first master screw 110A coupled to the first successive screw 112A as has been described in FIG. 1. The first master screw 110A includes the head 202. The head 202 includes a pair of apertures 402A-B. The pair of apertures 402A-B is adapted to hold the first universal joint 116A to achieve omnidirectional bending (as described in FIG. 1). The successive screw 112 depicts the inner threads 406 and the outer threads

404. Similarly, the other master screws 110 are coupled to the respective successive screws 112 as described above.

Figure 5:
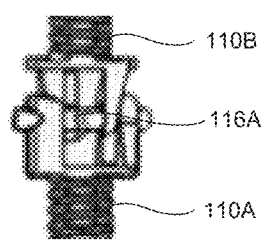
FIG. 5 illustrates an exploded view of a first universal joint of FIG. 1 according to an embodiment herein.

FIG. 5 illustrates an exploded view of the first universal joint 116A of FIG. 1 according to an embodiment herein. The first universal joint 116A, in an embodiment, a plus symbol like connection linkage, is adapted to couple the first master screw 110A and the second master screw 110B using the pair of apertures 402A-B in the head of the first master screw 110A and the second master screw 110B. The first universal joint 116A (e.g., the plus symbol like connection linkage) further provides omnidirectional bending in the desired direction. The first universal joint 116A further transfers the rotation from the first master screw 110A to the second master screw 110B. Similarly, the other universal joints 116 have the exploded view as described above.

Figure 6:
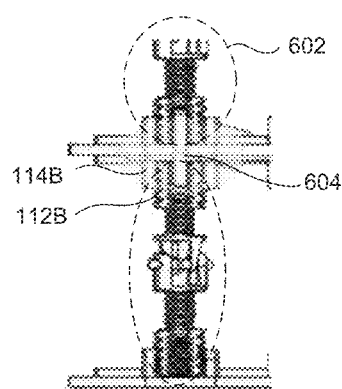
FIG. 6 illustrates an exploded view of a cascaded coupling of the two telescopic screw 3-DOF parallel manipulator systems of FIG. 1 according to an embodiment herein.

FIG. 6 illustrates an exploded view of a cascaded coupling of the two telescopic screw 3-DOF parallel manipulator systems of FIG. 1 according to an embodiment herein. Each master screw has a hollow cavity inside it to incorporate a shaft. The first master screw (110A) of the right-left telescopic screw assembly part of the 3-DOF parallel manipulator system is coupled to the right-left assembly part of the second master screw 110B of the existing 3-DOF parallel manipulator system through a common shaft 604. The common shafts reside inside the hollow cavity of the corresponding master screws. The common shaft 604 transfers the rotation from the first right-left telescopic screw assembly part of any of the telescopic screw assembly to the right-left telescopic screw assembly part 602 of the subsequent 3-DOF parallel manipulator system. The common shaft 604 is attached to the master screws in such a way that it can rotate along with the master screws to transfer rotational motion and has enough clearance within the master screws which enables it to slide within the master screws. The second nut 114B holds the second successive screw 112B and a successive screw of the subsequent 3-DOF parallel manipulator system.

Figure 7:
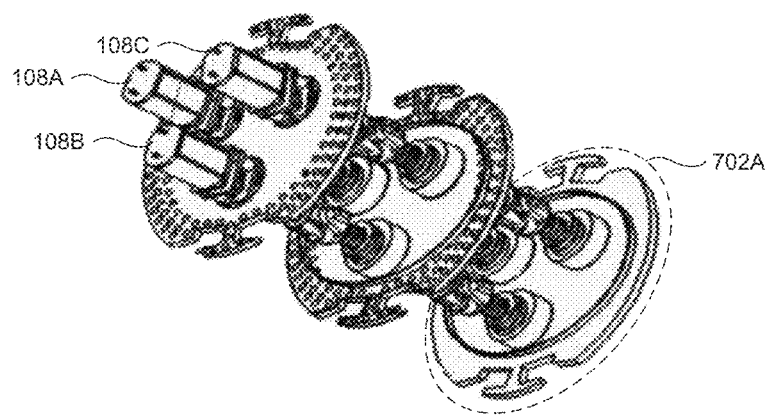
FIG. 7 illustrates a perspective view of a cascaded coupling of two of the 3-DOF parallel manipulator systems for achieving omnidirectional bending using three or more actuators according to an embodiment herein.

FIG. 7 illustrates a perspective view of a cascaded connection of the subsequent system 702A and the existing 3-DOF parallel manipulator system for achieving omnidirectional bending using three or more actuators 108A-C according to an embodiment herein. The subsequent system 702A is cascaded to the existing 3-DOF parallel manipulator system through three or more common shafts. The coupling between the subsequent system 702A and the existing 3-DOF parallel manipulator system is realized using three or more common shafts. The three or more common shafts bend the telescopic screw assemblies in 3-DOF parallel manipulator system 702A and the next 3-DOF parallel manipulator systems simultaneously, with only three or more actuators 108A-C. The three or more actuators 108A-C directly actuates the existing telescopic screw assemblies 106A-C and transfers rotational motion to the subsequent system 702A, via three or more common shafts. In one embodiment, the omnidirectional bending can be achieved serially in subsequent systems coupled to an existing system of the telescopic differential screw mechanism based 3-DOF parallel manipulator system using subsequent universal joints and subsequent telescopic screw assemblies. In another embodiment, the capacity of the three or more actuators 108A-C should be varied based on count of the subsequent systems. The robot consists of a cascade of such sub-modules and the power imposed on each of the telescopic screw assembly of a sub-module is transferred to the corresponding assembly of the cascaded sub-modules. Therefore, the number of sub-modules that can be cascaded is co-related by the maximum power rating of the actuators.

The cascaded system is actuated by 3 actuators and rotational motion from one system to the other is transferred via common shafts, which internally couples the left handed master screw of the first system with the corresponding master screws of the second system. The differential Rotations of the 3 telescopic screws result in the omnidirectional bending of the module.

Figure 8:
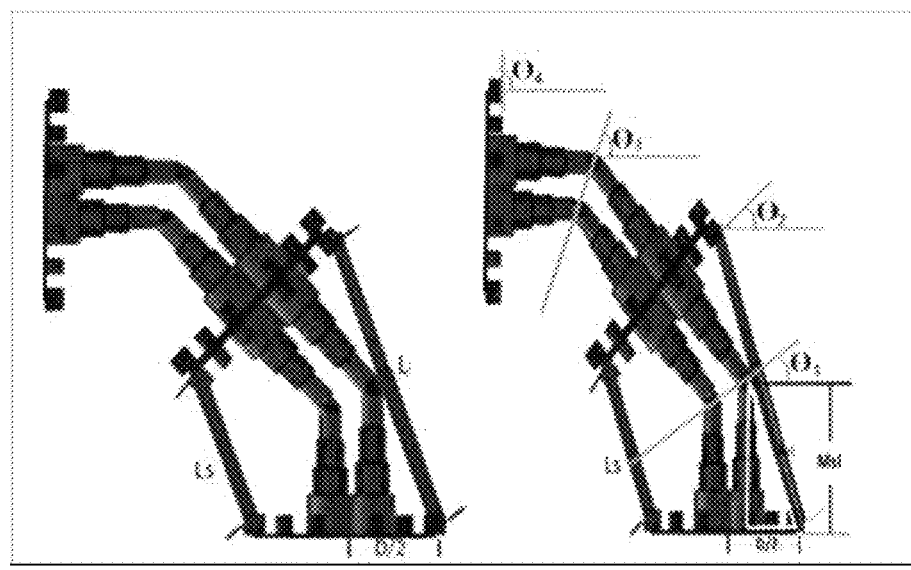
FIG. 8 is an exemplary view of multiple angular planes formed due to cascading bending of two 3-DOF parallel manipulator systems.

FIG. 8 is an exemplary view of multiple angular planes formed due to cascading bending of two 3-DOF parallel manipulator systems. The diameter of the robot is indirectly dependent upon the maximum bending compliance of the robot. Each telescopic 3-DOF (Degrees of freedom) motion can be represented as the motion of two cascaded triangular plates as shown in FIG. 8. The bending of the robot is uniform throughout its 3-DOF manipulator length. And hence as shown in the FIG. 8, the equation is arrived as follows, $$\Theta 1/1 = \Theta 2/2 = \Theta 3/3 = \Theta 4/4 (10) \quad \Theta 4 = 4*\Theta 1.$$

Vs is component of the distance screw from the centre on the line joining the centres of the any other screw and the centre point of the robot.

Msl=Maximum telescopic screw expansion length
D=Diameter of the base plate of Telescopic 3DOF system
Bl=Base length of the angled triangle highlighted in bright. Right
L=Distance between the centres of adjacent telescopic screw
Mrl=Half of the maximum telescopic rod expansion length
Irl=Internal rod length of the Telescopic rod
Erl=External rod length of the Telescopic rod In order to comply through sharp turns and to give an output angle identical to that of an active revolute joint in previous snake like compliant robots, we consider the total bent angle to be 90 degrees. Hence, $\Theta 4=\pi/4$; $\Theta 1=\pi/16$.

In order to calculate the diameter, D of the robot the base length of the right-angled triangle needs to be calculated.

$$D/2 = Bl + Vs (13) \quad Vs = L*\cos(\pi/3)(14) \quad Bl = Msl*\sin(\Theta 1)$$

In an embodiment, the distance of the screws from the centre is given by constraints mentioned above, here L=24 mm. Msl value is calculated by using eq. (1), as substituting by 80 mm. This provides the value for the D according to eq. (10) as 94 mm.

$$Mrl = (Wd + d/2)*\sin(\Theta 1) + Msl*\sin(\Theta 1)$$

Where, 'd' is the diameter of the universal joint. The maximum length of the individual telescopic rod, Tlmax is given by the equation.

$$Tl\mathrm{max} = 2*Mrl$$

Minimum length, Tlmin of the telescopic rod, Tlmin=Tlmax−2*(D/2)*sin ($\Theta 1$) Hence the length of the telescopic screw segments is Erl==Tlmin. Hence, the telescopic rod behaves as a rigid body, during transformation the R stoppers need not be pulled since the reactions force on the wire joint during transformation pushes the rods towards each other keeping the R stopper always at one extreme of its rotational degree range. Irl=Tlmax−Tlmin. Substituting 'D' derived from previous equations, and putting Wd=5 mm and d=2.5 mm. In an embodiment, the 3-DOF telescopic screw is a level 4 mechanism in which the each level is of length 2 cm. The stopper size is 2 mm in height. At its full length the telescopic set may increase to a height of 80 mm.

Figure 9:
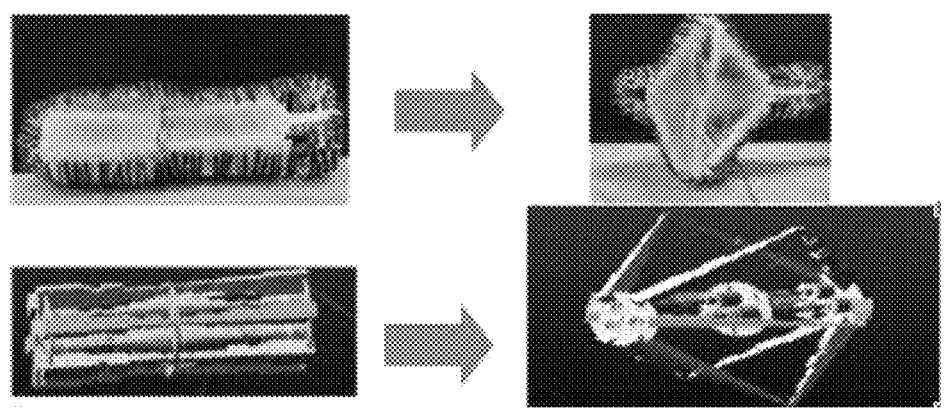
FIG. 9 is an exemplary view of transforming crawler robot enabled with 3-DOF parallel manipulator system to change shape.

FIG. 9 is an exemplary view of transforming crawler robot enabled with 3-DOF parallel manipulator system to change shape. The crawler robot also has the capability to bend and move through tight spaces yet maintain high traction on slippery surfaces. In an embodiment, the design of the robot includes a telescopic 3-DOF parallel manipulator system that is cascaded with one or more to 3-DOF parallel manipulator systems with the help of shafts that connect two or more 3-DOF parallel manipulator systems to provide higher degrees of bending along with a chain tensioner mechanism to maintain the constant tension in the chain, when the module is bent in any direction. The chassis of the robot consists of 6 pairs telescopic rods arranged at 60 degrees with respect to each other which surround the 3-DOF parallel manipulator systems. The rods in each pairs of rods are connected via compliant thick wire connectors. The driving mechanism consists of a driving motor that is connected to driving shaft via gears. The backbone of the robot constitutes the telescopic screw based 3-DOF parallel manipulator system. This robot has the ability to change its length by contracting or expanding the backbone in the longitudinal direction using the telescopic screw 3-DOF parallel manipulator system by unidirectionally actuating all the three screws. This helps robot contract/expand and behave as a variable length crawler and at extreme contraction as a spoked wheel. While in other ways, the robot can also behave as a compliant bendable crawler robot which can be used in snake-like locomotion. This can be achieved by the synchronous differential actuation of 3 telescopic screw assemblies which helps bending the backbone of the robot by actuating 3-DOF parallel manipulator robot that utilises this property to move into tight spaces while keeping the high traction properties of the crawler intact.

The telescopic differential screw mechanism based 3-DOF Parallel Manipulator system provides high angular rotations in achieving the omnidirectional bending. The telescopic differential screw mechanism based 3-DOF Parallel Manipulator system involves less material cost and production cost. The telescopic differential screw mechanism based 3-DOF Parallel Manipulator system further requires less maintenance. The telescopic differential screw mechanism based 3-DOF Parallel Manipulator system is also used for achieving surface compliance applications like crawling robots, painting robots, pipeline robots, etc. The telescopic differential screw mechanism based 3-DOF Parallel Manipulator system achieves sharp omnidirectional bending within the constrained space of the nuts and the screws. The telescopic differential screw mechanism based 3-DOF Parallel Manipulator system is modular in nature and subsequent systems can be cascaded to achieve uniform Omnidirectional bending in bigger modules and increase workspace of the systems. In telescopic differential screw mechanism based 3-DOF Parallel Manipulator system, the compactness of the mechanism can be enhanced by incorporating further multiple subsequent successive in the master screws to achieve sharp bending. This enables to achieve sharp bending in and further reduces the size of the 3-DOF Parallel Manipulator system. In an embodiment, the snake robot transforms into a big diameter and thin sized wheel. This transformation helps decrease the length of the module by more than fifty percent of its ideal crawling length. This wheel mode enables the robot to turn in a very confined space, enhancing the capability of any kind of robots like snake robot, quadruped or even biped developed using this module. Reduction in the length of a compliant robot without involving additional actuators and keeping the compliant quality of the robot intact is achieved by using telescopic 3-DOF bending system.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope.

What is claimed is:

1. A three degree of freedom (3-DOF) telescopic screw parallel manipulator system to enable differential length and omni-directional bending of the system, comprising:

a first circular rotating plate;

a second circular rotating plate that is coupled to the first circular rotating plate (102) using at least three telescopic screw assemblies, wherein the at least three telescopic screw assemblies that are actuated by at least three actuators (108A-C) rotate in a first direction or a second direction, wherein each of the at least three telescopic screw assemblies comprise a right-left telescopic screw assembly part and a left-right telescopic screw assembly part that are coupled to each other using at least three universal joints, wherein the at least three telescopic screw assemblies comprise a first telescopic screw assembly (106A), a second telescopic screw assembly (106B), or a third telescopic screw assembly (106C), wherein the first telescopic screw assembly (106A) comprises a first right left telescopic screw assembly part that comprise a first master screw (110A) comprising a first end and a second end that rotates in the first direction; and a first successive screw (112A) comprising a first end and a second end, wherein the first end of the first successive screw (112A) is coupled to the second end of the first master screw (110A), wherein the first master screw (110A) is adapted to rotate with respect to the first successive screw (112A) in a telescopic arrangement; and a second left-right telescopic screw assembly part that comprise a second master screw (110B) comprising a first end and a second end, wherein the first end of the second master screw (110B) is coupled to the first end of the first master screw (110A) using a first universal joint (116A) and enables the transfer of a rotation from the first master screw (110A) to the second master screw (110B) in the first direction; and a second successive screw (112B) comprising a first end and a second end, wherein the first end of the second successive screw (112B) is coupled to the second end of the second master screw (110B), wherein the second master screw (110B) is adapted to rotate with respect to the second successive screw (112B) in the telescopic arrangement;

wherein the at least three actuators (108A-C) that enable (a) synchronous or (b) differential actuation of the at least three telescopic screw assemblies in the first direction to enable the first rotation of the first master screw (110A) inside a first length of the first successive screw (112A) and the second rotation of the second master screw (110B) inside a second length of the second successive screw (112B), wherein the actuation in a second direction enables third rotation of the first master screw (110A) outside the first length of the first successive screw (112A) and the forth rotation of the second master screw (110B) outside the second length of the second successive screw (112B) in the telescopic arrangement, thereby subtracting or adding a part of a length of the telescopic screw assembly based on the direction of the actuation.

2. The three degree of freedom (3-DOF) telescopic screw parallel manipulator system according to claim 1, wherein the three degree of freedom (3-DOF) telescopic screw parallel manipulator system enables actuation of the first telescopic screw assembly (106A), the second telescopic screw assembly (106B), and the third telescopic screw assembly (106C) synchronously in the first direction for enabling an addition of the length of the three degree of freedom (3-DOF) telescopic screw parallel manipulator system.

3. The three degree of freedom (3-DOF) telescopic screw parallel manipulator system according to claim 1, wherein the three degree of freedom (3-DOF) telescopic screw parallel manipulator system enables actuation of the first telescopic screw assembly (106A), the second telescopic screw assembly (106B), and the third telescopic screw assembly (106C) synchronously in the second direction for enabling reduction of the length of the three degree of freedom (3-DOF) telescopic screw parallel manipulator system.

4. The three degree of freedom (3-DOF) telescopic screw parallel manipulator system according to claim 1, wherein the three degree of freedom (3-DOF) telescopic screw parallel manipulator system further comprises at least one of the first telescopic screw assembly (106A), the second telescopic screw assembly (106B), or the third telescopic screw assembly (106C) that is actuated in at least one of the first direction or the second direction to enable omni-directional bending of the three degree of freedom (3-DOF) telescopic screw parallel manipulator system in a range of 0 to 75 degrees.

5. The three degree of freedom (3-DOF) telescopic screw parallel manipulator system according to claim 1, wherein the differential actuation of the at least three of the three telescopic screw assemblies enable omni-directional bending of the three degree of freedom (3-DOF) telescopic screw parallel manipulator system, wherein the at least three actuators comprise a first actuator (108A) that actuates the first master screw (110A) to rotate with respect to the first successive screw (112A) wherein the rotation of the first master screw (110A) passively rotates the first universal joint (116A).

6. The three degree of freedom (3-DOF) telescopic screw parallel manipulator system according to claim 1, wherein the differential actuation of the at least three telescopic screw assemblies enables bending in a direction of the length of the telescopic screw assembly with relative reduction in the length with respect to other telescopic screw assemblies of the at least three telescopic screw assemblies.

7. The three degree of freedom (3-DOF) telescopic screw parallel manipulator system according to claim 1, wherein the three degree of freedom (3-DOF) telescopic screw parallel manipulator system further comprises at least three screw assemblies that are arranged in equal distance to each other.

8. The three degree of freedom (3-DOF) telescopic differential screw system according to claim 1, wherein the three degree of freedom (3-DOF) telescopic screw parallel manipulator system further comprises a plurality of the successive screws that are adapted in telescopic arrangement in each of the at least three telescopic screw assemblies to enable adaptive length and omni-directional bending of the system.

9. The three degree of freedom (3-DOF) telescopic differential screw system according to claim 1, wherein the three degree of freedom (3-DOF) telescopic screw parallel manipulator system further comprises:
a first nut (114A) with a third length, wherein a second end of the first successive screw (112A) is coupled to the first circular rotating plate (102) with the first nut (114A) wherein the first successive screw (112A) is adapted to rotate inside the third length of the first nut (114A) in the telescopic arrangement; and
a second nut (114B) with a forth length, wherein a second end of the second successive screw (112B) is coupled to the second circular rotating plate (104) with the second nut (114B), wherein the second successive screw (112B) is adapted to rotate inside the forth length of the second nut (114B) in the telescopic arrangement.

10. The three degree of freedom (3-DOF) telescopic screw parallel manipulator system according to claim 1, wherein the three degree of freedom (3-DOF) telescopic screw parallel manipulator system further comprises
a first stopper mechanism to stop further rotation of the first master screw (110A) on reaching the second end and to transfer the rotation to the first successive screw (112A); and
a second stopper mechanism to stop further rotation of the first successive screw (112A) on reaching the second end and transfer the rotation to the first nut (114A), wherein the first master screw (110A) is adapted to rotate inside the first length of the first successive screw (112A) and the first successive screw (112A) is adapted to rotate inside the third length of the first nut (114A).

11. The three degree of freedom (3-DOF) telescopic screw parallel manipulator system according to claim 10, wherein the first successive screw (112B) and the second successive screw (112B) comprise inner threads (406) and the outer threads (404) that are adapted to realize the stopper mechanism.

12. The three degree of freedom (3-DOF) telescopic screw parallel manipulator system according to claim 1, wherein the first master screw (110A) is coupled with the first successive screw (112A), such that outer threads of the first master screw (110A) match with inner threads of the first successive screw (112A) to achieve relative motion between the first master screw (110A) and the first successive screw (112A).

13. The three degree of freedom (3-DOF) telescopic screw parallel manipulator system according to claim 1, wherein the first circular rotating plate (102) is coupled to the second circular rotating plate (104) using the at least three telescopic screw assemblies that are arranged to each other at 120 degree.

14. The three degree of freedom (3-DOF) telescopic screw parallel manipulator system according to claim 1, wherein the first master screw (110A) and the second master screw (110B), both comprises a head (202) that is attached at a first end, wherein the head (202) includes a pair of apertures (402A-B) that is adapted to hold the first universal joint (116A) to achieve omnidirectional bending of the system.

15. The three degree of freedom (3-DOF) telescopic screw parallel manipulator system according to claim 14, wherein the first universal joint (116A) is adapted to couple the first master screw (110A) and the second master screw (110B) using the pair of apertures (402A-B) in the head of the first master screw (110A) and in the head of the second master screw (110B), wherein the first universal joint (116A) transfers the rotation from the first master screw (110A) to the second master screw (110B) to provide omnidirectional bending in a required direction when actuated by a first actuator (108A).

16. A telescopic differential screw system assembly comprising at least two of the three degree of freedom (3-DOF) telescopic screw parallel manipulator system of claim 1 in a cascading arrangement, wherein the first master screw (110A) of a second 3-DOF parallel manipulator system is coupled to the second master screw (110B) of the first 3-DOF parallel manipulator system through a common shaft (604), wherein the common shaft (604) is adapted to rotate inside a hollow cavity of the master screws that transfers the first rotation when at least one actuator actuates at least one telescopic screw assembly, to at least one of telescopic screw assemblies of the second 3-DOF parallel manipulator system through the master screws, wherein the second nut (114B) holds the second successive screw (112B) and a successive screw of the second 3-DOF parallel manipulator system.

17. The telescopic differential screw system assembly according to claim 16, wherein the assembly comprises at least three common shafts wherein the common shafts bends the telescopic screw assemblies in the second 3-DOF parallel manipulator system (702A) and the first 3-DOF parallel manipulator system simultaneously, with at least three actuators (108A-C) actuate at least three telescopic screw assemblies (106A-C).

18. The telescopic differential screw system assembly according to claim 16, wherein the assembly is comprised in a robotic arm.

* * * * *